United States Patent [19]
Krebs et al.

[11] 4,309,161
[45] Jan. 5, 1982

[54] APPARATUS FOR THE INJECTION MOLDING OF RADIAL ENDLESS TIRE-TREAD RINGS

[75] Inventors: Gerd Krebs; Rainer Friedrich; Hans-Peter Saul, all of Hamburg, Fed. Rep. of Germany

[73] Assignee: Fried. Krupp Gesellschaft Mit Beschränkter Haftung, Essen, Fed. Rep. of Germany

[21] Appl. No.: 185,513

[22] Filed: Sep. 9, 1980

[30] Foreign Application Priority Data

Sep. 15, 1979 [DE] Fed. Rep. of Germany ....... 2937402

[51] Int. Cl.³ .......................... B29C 5/04; B29F 1/00; B29C 6/00
[52] U.S. Cl. .................... 425/115; 425/542; 425/129 R; 264/311
[58] Field of Search ............. 425/47, 542, 129 R, 425/115; 264/311

[56] References Cited

U.S. PATENT DOCUMENTS

| 2,615,203 | 10/1952 | Du Pree .................... 425/812 X |
| 3,645,655 | 2/1972 | Beneze ...................... 264/311 X |
| 4,043,725 | 8/1977 | Schmidt ........................ 425/542 |
| 4,257,994 | 3/1981 | Leblanc et al. ............. 425/542 X |

FOREIGN PATENT DOCUMENTS

339756  11/1977  Austria ................................ 425/47

*Primary Examiner*—J. Howard Flint, Jr.
*Attorney, Agent, or Firm*—Karl F. Ross

[57] ABSTRACT

An apparatus for the injection molding of tire treads on reinforcing belts (tire-tread rings) comprises a belt support which is substantially incompressible but is yieldably mounted on a back-up structure and defines a mold cavity with a pair of half shells which close around the support. When the injection-molded tread is released by opening of the half shells, the support can be relaxed and the tread structure picked up by a transfer ring.

16 Claims, 7 Drawing Figures

4,309,161

APPARATUS FOR THE INJECTION MOLDING OF RADIAL ENDLESS TIRE-TREAD RINGS

FIELD OF THE INVENTION

Our present invention relates to an apparatus for the fabrication of a radial tread ring or like structure of rubber by injection molding the rubber upon a reinforcement such as a belt for use in the fabrication of a tire, especially a pneumatic tire for automotive vehicle purposes. More particularly, the invention relates to an apparatus for injection molding endless rings of rubber or another elastomer.

BACKGROUND OF THE INVENTION

In the building of automotive vehicle tires and the like, it is frequently desirable to prepare by injection molding of an elastomeric material such as rubber, a so-called tread ring or running ring which forms the running surface of the tire and consists of an endless annular layer of rubber bonded to a reinforcement in the form of so-called belts.

It is known to provide, for the production of pneumatic tires without carcasses, an apparatus for the casting or injection molding of rubber upon one or more belts, e.g. as described in Austrian Pat. No. 339,757, using a core and means for forming a mold cavity with the core such that, upon separation of the parts of the mold cavity and removal of the core, the tire structure is obtained.

In this system, the core has upper and lower portions axially movable relative to at least two rows of segments and the latter rows of segments comprise radially movable segments to enable separation of the annular molded body from the mold-form elements.

In Austrian Pat. No. 339,756, the outer shell-forming members of the mold comprise groups of segments swingable about axes and lying on opposite sides of the rubber ring which is to form the tire.

The fabrication of pneumatic tires with carcasses with either of these apparatuses is not convenient since the systems described cannot readily accommodate the belts. Accordingly, a two-stage process must be provided in which the belts are first wound upon a winding drum, are separately injection molded with tread rubber to form an endless layer thereof on the belts and the resulting tread ring must be combined with the remainder of the tire.

Conventional apparatus for this purpose requires complicated manipulation, storage and transportation of the rings and a multiplicity of steps which are seldom sufficiently coordinated to make the process economical.

The molding operations themselves are complicated by the relatively complex mold-forming members as well.

OBJECTS OF THE INVENTION

It is the principal object of the present invention to provide a simplified apparatus for the fabrication of radial endless tread rings whereby the disadvantages of earlier systems are avoided.

Another object of the present invention is to provide a relatively simple apparatus capable of rapid, energy-conserving and cost-saving fabrication of high quality automotive vehicle tires while minimizing or eliminating intermediate steps and complicated transport and storage arrangements between steps.

Still another object of the invention is to provide an improved mold for the production of tread rings for the purposes described.

Finally, it is an object of the invention to provide an improved apparatus for manipulating tread rings fabricated by injection molding.

SUMMARY OF THE INVENTION

These objects and others which will become apparent hereinafter are attained, in accordance with the present invention, by providing a molding apparatus having a core which forms a circumferentially continuous, elastic but substantially incompressible, variable-diameter coiling disk or drum supported by an annular metallic body and cooperating with a pair of half shells to define the mold cavity for the tread rubber injection molded onto the belts wound upon the elastic member.

According to the invention, the injection molding of the tread layer is thus carried out directly upon the belts on the surface on which they are wound by forming this surface as part of the injection-molding cavity, thereby eliminating any need for winding the belt separately from the injection molding of the tread strip and any need for transportation between these two stations.

The injection-molding apparatus forms part of the shell-carrying unit and is shifted with the shells.

After the injection molding of the rubber and opening of the mold shells, the assembly of injector and shells can be shifted out of the path of a transfer ring which picks up the tread ring from the core upon relaxation of the elastic body upon which the belts are coiled. The shells and injector can thus be shifted as a unit into a stand-by position awaiting the next molding operation, or shifted to cooperate with another core upon which a belt has been wound for the injection molding of another ring. In the latter case, of course, the productivity of the apparatus is greater. Furthermore, the system of the invention eliminates much of the mold structure hitherto required.

The apparatus of the invention is so contructed that the injection pressure required for the molding of the tread rings is maintained continuously in the unit.

According to the invention, moreover, annular cylinders are provided on opposite axial sides of the core and cooperate with annular pistons shiftable axially and formed with frustoconical surfaces and mold-defining edges to distend the opposite sides of the elastic belt-carrying body and simultaneously seal the mold cavity.

This permits injection molding under especially high pressures and even allows the cylinders and pistons to be used for after-compaction of the injection molding material. The injection-molded product thus is of especially high quality.

According to the invention, at least one of the annular pistons bears via a frustoconical member against an elastic but substantially incompressible body to seal the inlet from the injector to the mold cavity. The advantage of this arrangement is that the injection molding pressure should be sufficient to overcome pressure of this sealing body or ring which, at the conclusion of molding, seals off the passage and provides a certain degree of after-compaction.

According to the invention, in addition, the mold-forming shells are profiled on their internal surfaces to correspond to the outer profile of the tread ring so that the tread profile of the running surface of the tire can be imparted directly to the tread ring during the molding step of the present invention. The mold shells have been found to be easily serviced as well.

The half shells may open and close radially and/or axially and to this end are mounted upon the injector for movement in the corresponding direction. In principle, however, it is possible to make the injection unit and the mold shells fixedly located and to provide the belt-coiling mandrel so that it is axially movable.

It has been found to be advantageous to provide cooperating centering edges on the belt-coiling mandrel or coil and upon the mold shells which are effective during opening and closing of the mold shells. The mold shells are locked by closure keys or wedges on the mold shells actuated by hydraulic cylinders and are displaced by cylinders as well. The mold cavity formed between the yieldable mandrel surface and the mold shells, including the belts, can seal automatically.

The belt-coil mandrel and the aforementioned sealing ring are advantageously constituted of polyurethane which has a high modulus of elasticity and is substantially incompressible.

The mandrel can have V-shaped inwardly indented disks to allow variation in diameter and hence free selection of the diameter of the ring. To support the mandrel against the high compressive forces during injection, a metallic back-up body is provided for the mandrel. The actual displacement of the mandrel can be effected by compressed air or mechanical means.

To receive the injection molded tread ring bonded to its belts, a transfer ring is axially shiftable relative to the coiling mandrel. This also has inwardly indented V-shaped disks and can be of variable diameter, controlled by compressed air, to grip the injection molded ring.

The interior of the coiling mandrel can be provided with circumferentially spaced pins, ribs or support rings for reinforcement and to limit any spread of the mandrel.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
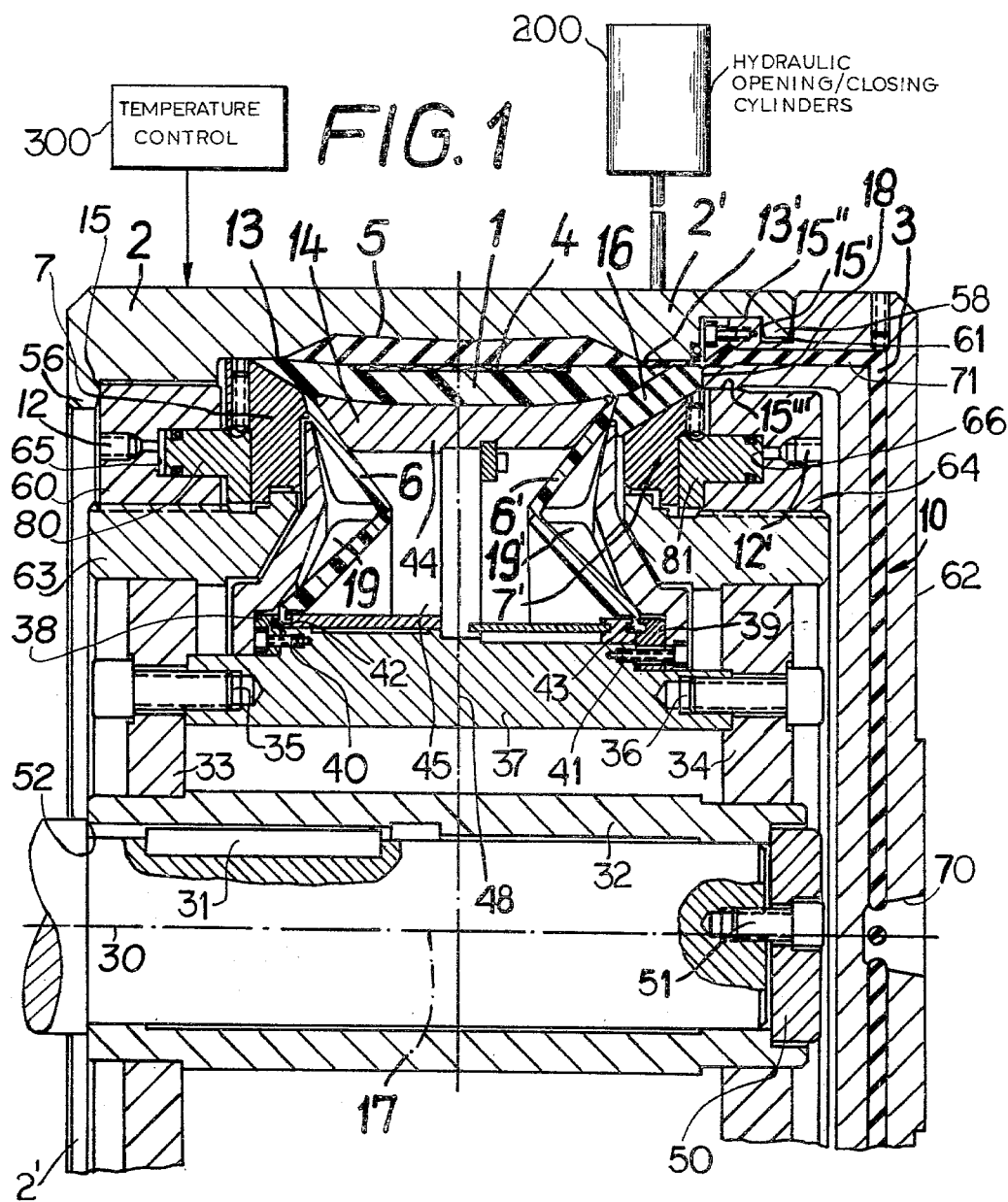
FIG. 1 is a cross-sectional view through a portion of an injection-molding assembly for injecting tread rubber onto a belt.

The apparatus shown in FIG. 1 for the injection molding of rubber rings for tires, comprises a belt-widening mandrel generally represented at 1 and supported by a metal back-up ring 14. The resulting core can be engaged between a pair of half shells 2 and 2', radially shiftable by hydraulic cylinders 200 so that their parting plane coincides with a plane perpendicular to the paper in FIG. 1 through the axis 17. The shells are connected to a temperature controller 300 so that they can be cooled or heated.

The axis 17 is defined by a shaft 30 which is keyed at 31 to a hub 32 carrying a pair of disks 33 and 34 which, in turn, are bolted by screws 35 and 36 to a cylindrical sleeve 37. Clamping rings 38 and 39 are attached by bolts 40 and 41 to the sleeve 37 and engage the inner edges 42 and 43 of inwardly indented V-shaped disks 6 and 6' which are unitary with the cylindrical portion 44 of the mandrel. This forms a space 45 around the sleeve 37 and within the cylindrical portion 44 to which compressed air can be fed, the air being communicated via the passages 46' to the underside of cylindrical portion 44, for expansion of the mandrel. The metal ring 14 is supported on arms 48 reaching outwardly from the sleeve 37.

The hub 32 is locked by a disk 50 and a screw 51 against a shoulder 52 of the shaft 30 which rotates to allow coiling of the belt 4 on the mandrel 1.

The radially movable shells 2 and 2' have inwardly extending flanges 56 and 58 which reach behind an outer ring 60 and into a groove 61 of the injector plate 62 of an injection-molding assembly 10 shown only generally in the drawing.

The ring 60 is threaded onto a support 63 mounted on the plates 33 and 34. A similar ring 64 is likewise provided and the rings 60 and 64 are formed with annular cylinders 65 and 66 communicating with compressed air or other pressurized fluid passages 12 and 12'.

The plate 62 has a central passage 70 communicating with the extruder nozzle and with a plurality of angularly spaced radial bores 3 which run into axial feed passages 71 communicating with the mold cavity 5 in which the belts 4 have previously been disposed.

The mandrel 1 is adapted to be pressed by cones 7 and 7' against the interior of the shells 2 and 2' to seal off the mold cavity 5. Each cone 7, 7' is connected to the respective piston 80, 81 in a cylinder 65, 66.

A sealing ring 16, which like the mandrel 1 is composed of polyurethane, is provided to seal the feed end of the mold cavity 5 at 18.

The half shells 2, 2' and the core received therein have centering edges 15, 15', 15" and 15''' to center the shells relative to the belt widening mandrel 1.

The mandrel thus sealingly engages the shell at the edges 13 and 13'.

Figure 2:
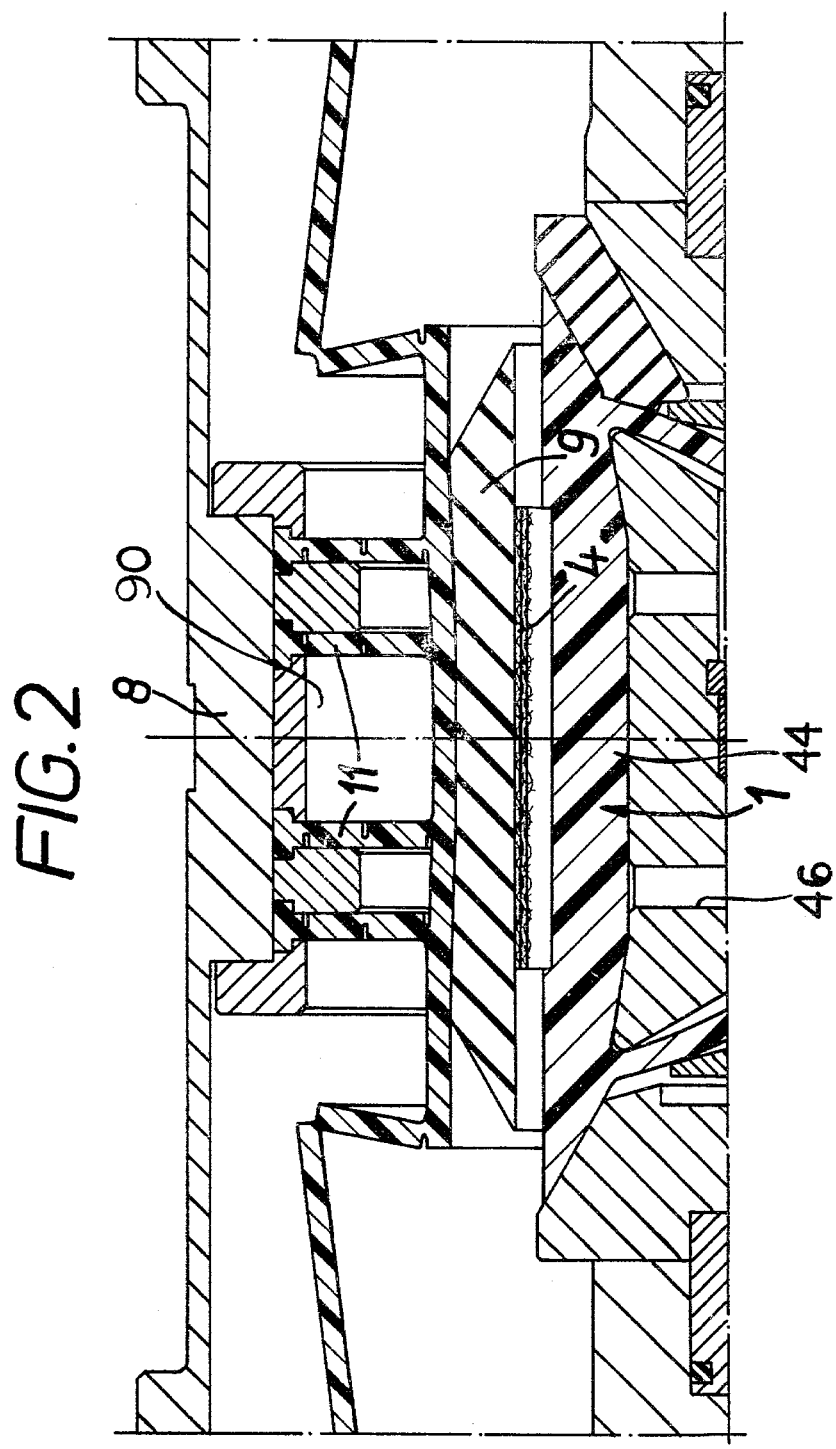
FIG. 2 is a diagrammatic section showing the cooperation of the transfer ring and the mandrel.
Figure 3:
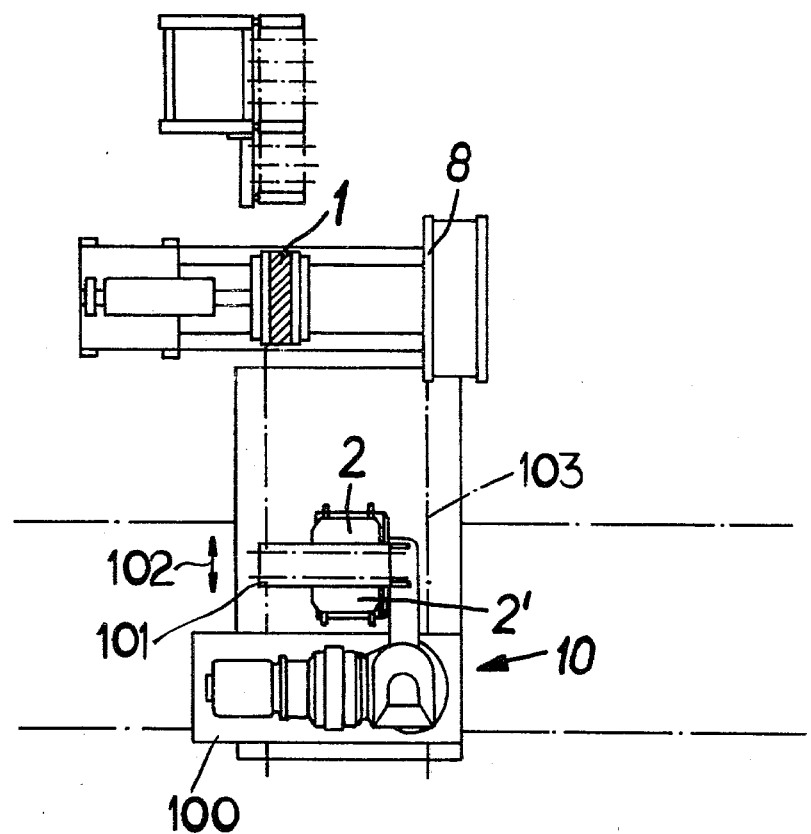
FIGS. 3 through 7 are diagrams illustrating successive steps in the fabrication of a tread ring in accordance with the invention.
Figure 4:
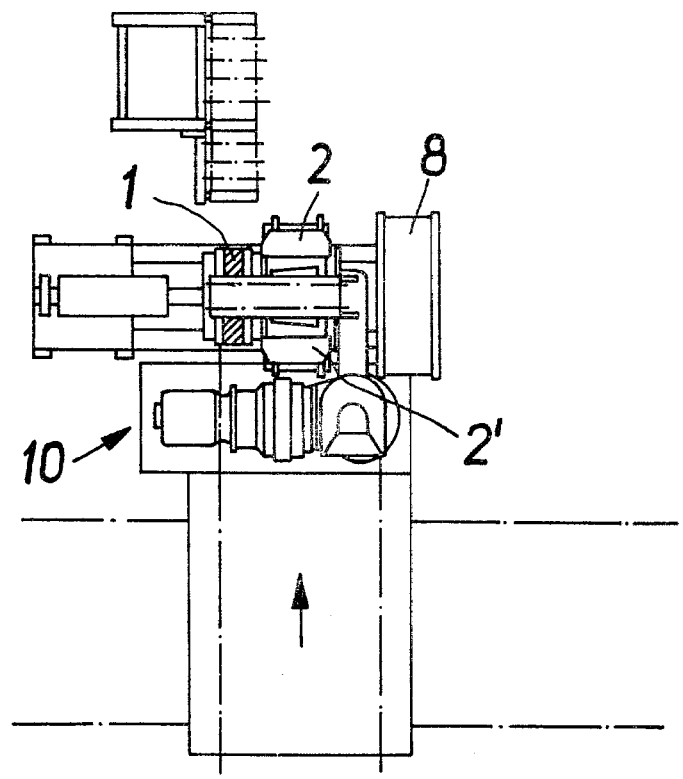
Figure 5:
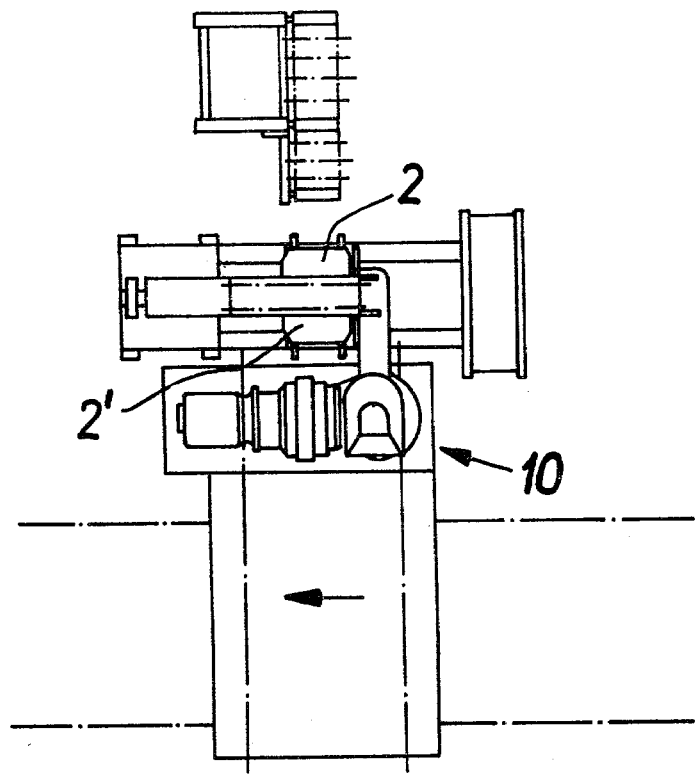
Figure 6:
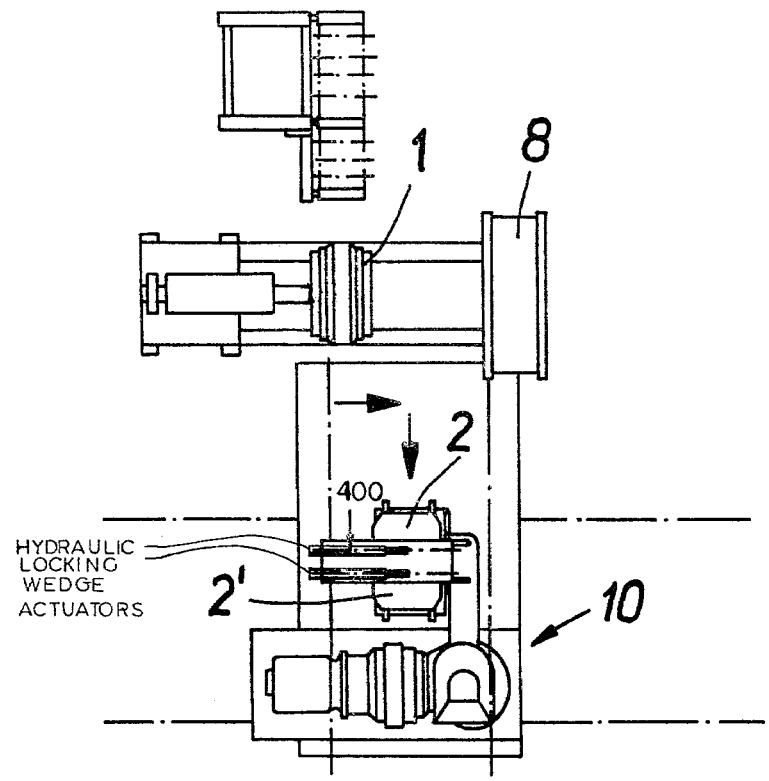
Figure 7:
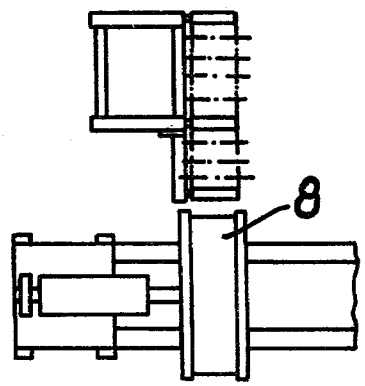

When the shells are separated and removed from the region of the injection-molded tread ring, a transfer ring can axially surround the core as is shown in FIG. 2 at 8. This transfer ring 8 has V-shaped inwardly indented disks 11 so that it is deformable against the molded tread ring upon the passage of compressed air into the chamber 90, thereby enabling the tread ring 9 to be withdrawn upon relaxation of the mandrel.

FIGS. 3 through 7 show the sequence of operation.

Initially the mandrel 1, from which an injection molded ring has previously been removed (FIG. 3), is ready to be aligned with the injection unit 10 with which the half shells 2 and 2' are coupled, e.g. on a common carriage 100 supporting a carrier 101 upon which the shells can be moved radially of the axis of the belt carrier in the direction of arrows 102. The carriage 100 may be displaceable on tracks represented at 103 into the position shown in FIG. 4 in which, when the segments 2 and 2' are spread apart the carriage 100 can be shifted to the left to accommodate the mandrel within the shells (FIG. 5) which are closed. Naturally, the belt is wound upon the mandrel prior to the closure of the shells by the hydraulic means 200. The shells are locked closed by closing wedges which are not illustrated but are actuated by cylinders 400 and injection molding can be effected. Prior to injection molding, fluid is supplied through passage 12 to drive the piston 80 to the right and seal edge 13. At the conclusion of the injection molding operation, the cylinder 66 is pressurized and piston 81 drives member 7' to the left to enable sealing ring 16 to close off the inlet side 18 and press edge 13' sealingly against the shells. This interrupts further flow of the elastomeric material and provides after-compaction. Any air inclusions are likewise driven out.

The shells are separated and the unit 10 withdrawn (FIG. 6) and the transfer ring 8 shifted over the mandrel to enable the tread ring to be removed.

The tread ring can then be subjected to pressing and like tire building operations in the usual manner.

We claim:

1. An apparatus for the forming of tread rings, e.g. for pneumatic tires, comprising:

an elastic mandrel of substantially incompressible material having a generally cylindrical portion for widening of a belt thereon;

at least two shells adapted to enclose said mandrel and defining a mold cavity therewith;

means for injecting an elastomer into said cavity; and a metal ring-shaped backing member supporting said mandrel, said backing member and said mandrel being mounted upon a core, said core being formed with a pair of annular cylinders provided with respective cones engaging opposite sides of said mandrel for sealing said sides of said mandrel against said shells.

2. The apparatus defined in claim 1, further comprising a substantially incompressible ring interposed between one of said cones and said shells at least along the path of elastomer injection molded in said cavity to cut off the flow of elastomer thereto.

3. The apparatus defined in claim 1 wherein said shells are internally profiled to impart a complementary profile to the injection-molded ring.

4. The apparatus defined in claim 1 wherein said shells are provided with temperature control means.

5. The apparatus defined in claim 1 wherein said shells are half shells.

6. The apparatus defined in claim 1 wherein said shells are shiftable radially relative to one another and to said core.

7. The apparatus defined in claim 1 wherein said shells and said injection means are mounted upon a common carriage for movement relative to said core.

8. The apparatus defined in claim 7 wherein said shells and said core are provided with mutually engaging centering edges for centering said shells on said core.

9. The apparatus defined in claim 7 wherein hydraulic cylinders are provided to open and close said shells.

10. The apparatus defined in claim 7 wherein hydraulic cylinders actuate locking wedges for said shells.

11. The apparatus defined in claim 7 wherein said mandrel is composed of polyurethane.

12. The apparatus defined in claim 11 wherein said mandrel has a pair of V-shaped inwardly indented disks.

13. The apparatus defined in claim 12, further comprising means for supplying compressed air to said mandrel.

14. The apparatus defined in claim 13 wherein disks of said mandrel are formed with reinforcing members.

15. The apparatus defined in claim 7, further comprising a transfer ring axially shiftable relative to said core for removing the tread ring therefrom.

16. The apparatus defined in claim 15 wherein said transfer ring has an inwardly deflectible member engageable with said tread ring.

* * * * *